US012093986B2

(12) United States Patent
Lindsey et al.

(10) Patent No.: US 12,093,986 B2
(45) Date of Patent: *Sep. 17, 2024

(54) COMPUTER-BASED SYSTEMS CONFIGURED TO PROVIDE ACTIONABLE GRAPHICAL USER INTERFACES ON DIFFERENT COMPUTING DEVICES OF DIFFERENT TYPES

(71) Applicant: Capital One Services, LLC, McLean, VA (US)

(72) Inventors: Leslie Lindsey, Celina, TX (US); Margaret Erlandson, Plano, TX (US); Abhinav Sharma, Flower Mound, TX (US); Neeraj Kumar, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 343 days.

This patent is subject to a terminal disclaimer.

(21) Appl. No.: 17/561,135

(22) Filed: Dec. 23, 2021

(65) Prior Publication Data
US 2022/0114633 A1 Apr. 14, 2022

Related U.S. Application Data

(63) Continuation of application No. 16/782,879, filed on Feb. 5, 2020, now Pat. No. 11,210,715.

(51) Int. Cl.
*G06Q 30/0601* (2023.01)
*G06F 3/04847* (2022.01)
*G06F 16/954* (2019.01)
*G06Q 10/083* (2023.01)
*G06Q 20/10* (2012.01)
*G06Q 20/32* (2012.01)
(Continued)

(52) U.S. Cl.
CPC ..... *G06Q 30/0605* (2013.01); *G06F 3/04847* (2013.01); *G06F 16/954* (2019.01);
(Continued)

(58) Field of Classification Search
CPC ............. G06Q 30/0605; G06Q 10/083; G06Q 20/108; G06Q 20/3223; G06Q 20/3255;
(Continued)

(56) References Cited

U.S. PATENT DOCUMENTS 9,659,323 B2   5/2017  Friedman
2007/0038716 A1  2/2007  Saguy
(Continued)

OTHER PUBLICATIONS

Oct. 1, 2009; eCommerce Method for Wish List Purchase Percentage Broadcasting to Social Networks An IP.com Prior Art Database Technical Disclosure https://ip.com/IPCOM/000188349 (Year: 2009).*
(Continued)

*Primary Examiner* — Michelle T Kringen
(74) *Attorney, Agent, or Firm* — Greenberg Traurig, LLP

(57) ABSTRACT

A method includes receiving a request to initiate a group gift indicating a gift date on which the group gift should be sent to a receiver of the gift. The method further includes determining, electronic devices to send invitations to contribute to the group gift and sending the invitations to the electronic devices. The invitations prompt a user to respond with a single action whether the user would like to contribute or not. The method further includes receiving responses from the electronic devices indicating an approval to contribute to the group gift or a refusal to contribute to the group gift. The method further includes initiating a physical gift purchase as part of the group gift and sending a message to a gift receiver electronic device that includes information about a monetary gift.

20 Claims, 9 Drawing Sheets

(51) Int. Cl.
  *G06Q 40/02* (2023.01)
  *H04L 51/58* (2022.01)
  *H04L 67/02* (2022.01)
  *H04L 67/55* (2022.01)
  *H04W 4/40* (2018.01)
  *G06Q 10/107* (2023.01)
  *G06Q 10/109* (2023.01)
  *H04B 1/3827* (2015.01)

(52) U.S. Cl.
  CPC ......... *G06Q 10/083* (2013.01); *G06Q 20/108* (2013.01); *G06Q 20/3223* (2013.01); *G06Q 20/3255* (2013.01); *G06Q 30/0633* (2013.01); *G06Q 40/02* (2013.01); *H04L 51/58* (2022.05); *H04L 67/02* (2013.01); *H04L 67/55* (2022.05); *H04W 4/40* (2018.02); *G06Q 10/107* (2013.01); *G06Q 10/109* (2013.01); *H04B 1/3827* (2013.01)

(58) Field of Classification Search
  CPC .. G06Q 30/0633; G06Q 40/02; G06Q 10/107; G06Q 10/109; H04W 4/40; G06F 16/954; G06F 3/04847; H04L 51/58; H04L 67/55; H04L 67/02; H04B 1/3827
  See application file for complete search history.

(56) References Cited

U.S. PATENT DOCUMENTS

| | | | |
|---|---|---|---|
| 2009/0055488 A1 | 2/2009 | Berry et al. | |
| 2009/0069038 A1* | 3/2009 | Olague | H04N 21/488 725/139 |
| 2009/0132665 A1 | 5/2009 | Thomsen et al. | |
| 2009/0192873 A1 | 7/2009 | Marble | |
| 2012/0317214 A1* | 12/2012 | Brunner | G06Q 10/107 709/204 |
| 2013/0054330 A1* | 2/2013 | O'Donnell | G06Q 30/06 705/26.1 |
| 2013/0211942 A1 | 8/2013 | Linden et al. | |
| 2017/0053509 A1 | 2/2017 | Mangum | |

OTHER PUBLICATIONS

IP.com Disclosure No. IPCOM000227834D; https://ip.com/IPCOM/000227834 Publication Date: May 21, 2013 (Year : 2013).*
Free Online Invitations, Premium Cards and Party Ideas—Evite «https://www.evite.com» retrieved Dec. 19, 2019.
Liu et al., "Collaborative gift registry in multi-channel retail commerce", Seventh IEEE International Conference on E- Commerce Technology (CEC'05), Munich, Germany, 2005, pp. 176-180.

* cited by examiner

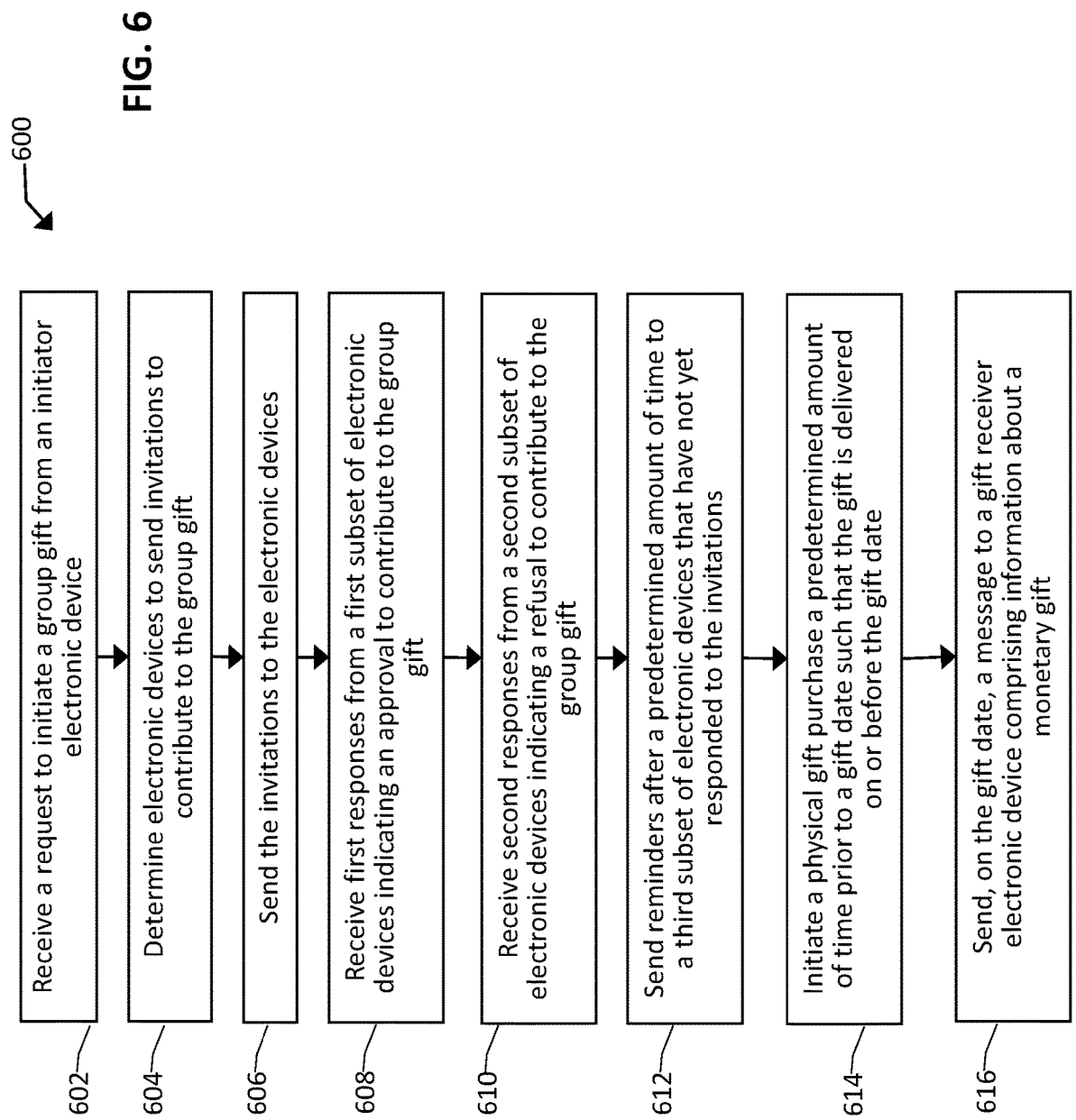

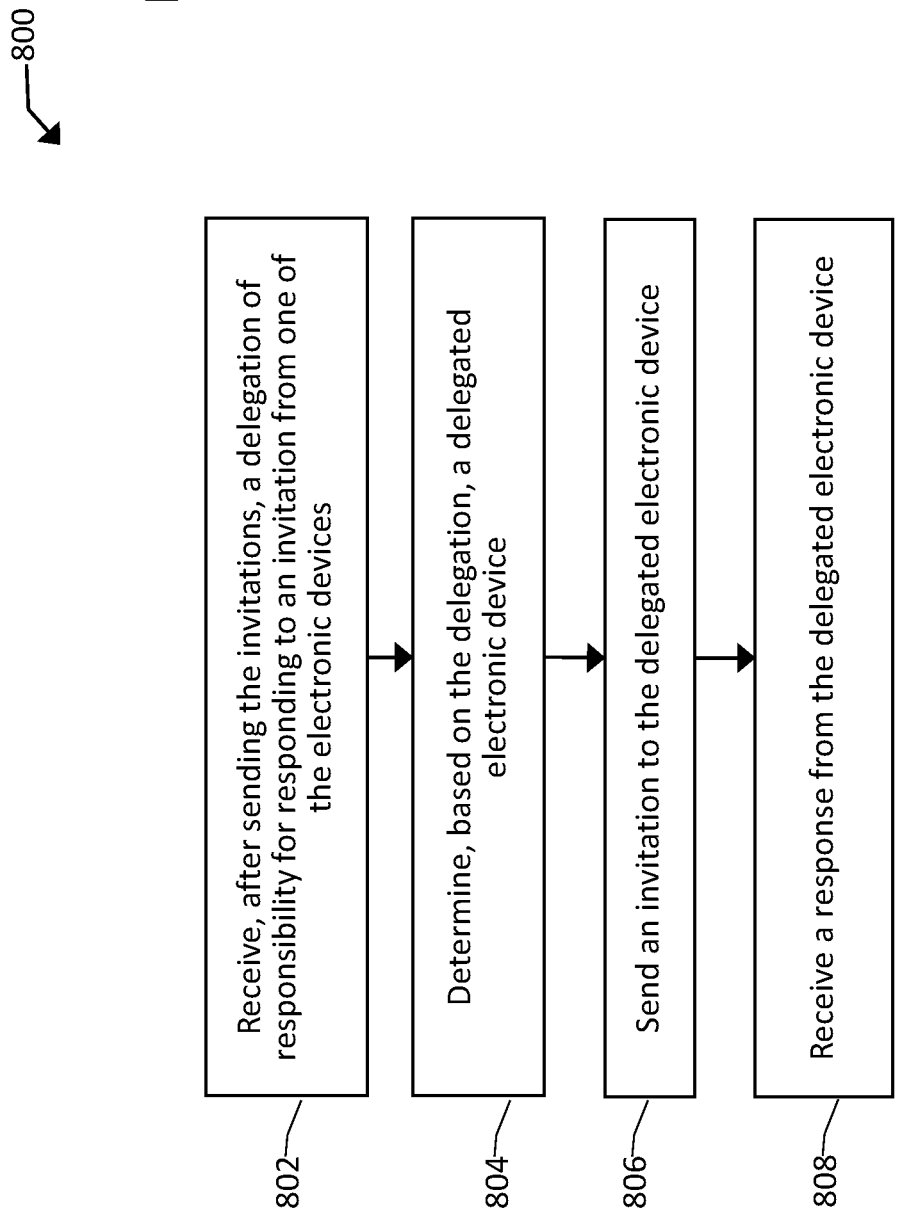

COMPUTER-BASED SYSTEMS CONFIGURED TO PROVIDE ACTIONABLE GRAPHICAL USER INTERFACES ON DIFFERENT COMPUTING DEVICES OF DIFFERENT TYPES

CROSS-REFERENCE TO RELATED APPLICATION

This application is a continuation of and claims priority to U.S. patent application Ser. No. 16/782,879, filed on Feb. 5, 2020 (now granted as U.S. Pat. No. 11,210,715), the disclosure of which is hereby expressly incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to computer-based systems configured to provide actionable graphical user interfaces on computing devices and methods of use thereof.

BACKGROUND OF TECHNOLOGY

A computer network platform/system may include a group of computers (e.g., clients, servers, etc.) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following elements of receiving, by one or more processors that are each part of a payment processing system, a request to initiate a group gift from an initiator electronic device. The request includes a gift date on which the group gift should be sent to a receiver of the gift. The method further includes determining, by the one or more processors, a plurality of mobile electronic devices to send a first type of invitations to contribute to the group gift and determining a plurality of non-mobile electronic devices to send a second type of invitations to contribute to the group gift. The method further includes sending, by the one or more processors, the first type of invitations to the plurality of mobile electronic devices and the second type of invitations to the non-mobile electronic devices. Each of the first type of invitations includes a push notification to an application (app) on each of the plurality of mobile electronic devices or a text message to each of the plurality of mobile electronic devices. The push notification or text message of each of the first type of invitations prompts a user to respond with a single action whether the user would like to contribute or not. The method further includes receiving, by the one or more processors, a first response from each of a first subset of the plurality of mobile electronic devices indicating an approval to contribute to the group gift. The approval includes an authorization to deduct from or charge to an account associated with a respective one of the first subset of the plurality of mobile electronic devices. The method further includes receiving, by the one or more processors, a second response from each of a second subset of the plurality of mobile electronic devices indicating a refusal to contribute to the group gift. The method further includes sending, by the one or more processors, after a first predetermined amount of time after the invitations are sent or on a predetermined date indicated in the request to initiate the group gift, a reminder to each of a third subset of the plurality of mobile electronic devices that have not responded to the first type of invitations. The method further includes initiating, by the one or more processors, a second predetermined amount of time prior the gift date, a physical gift purchase as part of the group gift using funds deducted from or charged to accounts associated with at least the first subset of the plurality of mobile electronic devices. The second predetermined amount of time is configured to facilitate delivery of the physical gift purchase to the receiver of the gift on or before the gift date. The method further includes sending, by the one or more processors, on the gift date, a message to a gift receiver electronic device includes information about a monetary gift. The monetary gift is a remainder of the funds deducted from or charged to accounts associated with at least the first subset of the plurality of mobile electronic devices that was not used for the physical gift purchase.

In some embodiments, the present disclosure provides an exemplary technically improved computer-based system that includes at least the following components of a memory and at least one processor coupled to the memory. The processor is configured to receive a request to initiate a group gift from an initiator electronic device. The request includes a gift date on which the group gift should be sent to a receiver of the gift. The processor is further configured to determine a plurality of mobile electronic devices to send invitations to contribute to the group gift. The processor is further configured to send the invitations to the plurality of mobile electronic devices. Each of the invitations includes a push notification to an application (app) on each of the plurality of mobile electronic devices or a text message to each of the plurality of mobile electronic devices. The processor is further configured to receive a first response from each of a first subset of the plurality of mobile electronic devices indicating an approval to contribute to the group gift. The first response is sent as a result of a single action by each user of the first subset of the plurality of mobile electronic devices. The processor is further configured to receive a second response from each of a second subset of the plurality of mobile electronic devices indicating a refusal to contribute to the group gift. The processor is further configured to send, after a first predetermined amount of time after the invitations are sent or on a predetermined date indicated in the request to initiate the group gift, a reminder to each of a third subset of the plurality of mobile electronic devices that have not responded to the invitations. The processor is further configured to initiate, a second predetermined amount of time prior to the gift date, a physical gift purchase as part of the group gift using funds deducted from or charged to accounts associated with at least the first subset of the plurality of mobile electronic devices. The second predetermined amount of time is configured to facilitate delivery of the physical gift purchase to the receiver of the gift on or before the gift date. The processor is further configured to send, on the gift date, a message to a gift receiver electronic device including information about a monetary gift. The monetary gift is a remainder of the funds deducted from or charged to accounts associated with at least the first subset of the plurality of mobile electronic devices that was not used for the physical gift purchase.

In some embodiments, the present disclosure provides an exemplary technically improved computer-based non-transitory computer readable medium that includes instructions stored thereon that, upon execution of a computing device, cause the computing device to perform operations of receiving a request to initiate a group gift from an initiator electronic device. The request includes a gift date on which the group gift should be sent to a receiver of the gift. The instructions further cause the computing device to perform operations of determining a plurality of mobile electronic devices to send invitations to contribute to the group gift. The instructions further cause the computing device to perform operations of sending the invitations to the plurality of mobile electronic devices. Each of the invitations includes a push notification to an application (app) on each of the plurality of mobile electronic devices or a text message to each of the plurality of mobile electronic devices. The instructions further cause the computing device to perform operations of receiving a first response from each of a first subset of the plurality of mobile electronic devices indicating an approval to contribute to the group gift. The instructions further cause the computing device to perform operations of receiving a second response from each of a second subset of the plurality of mobile electronic devices indicating a refusal to contribute to the group gift. The instructions further cause the computing device to perform operations of sending, after a first predetermined amount of time after the invitations are sent or on a predetermined date indicated in the request to initiate the group gift, a reminder to each of a third subset of the plurality of mobile electronic devices that have not responded to the invitations. The instructions further cause the computing device to perform operations of initiating, a second predetermined amount of time prior to the gift date, a physical gift purchase as part of the group gift using funds deducted from or charged to accounts associated with at least the first subset of the plurality of mobile electronic devices. The second predetermined amount of time is configured to facilitate delivery of the physical gift purchase to the receiver of the gift on or before the gift date. The instructions further cause the computing device to perform operations of sending, on the gift date, a message to a gift receiver electronic device including information about a monetary gift. The monetary gift is a remainder of the funds deducted from or charged to accounts associated with at least the first subset of the plurality of mobile electronic devices that was not used for the physical gift purchase.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 6 is a flowchart illustrating a process for initiating, collecting, and delivering group gifts in accordance with one or more embodiments of the present disclosure.

FIG. 8 is a flowchart illustrating a process for delegating responsibility for responding to an invitation to participate in a group gift in accordance with one or more embodiments of the present disclosure.

DETAILED DESCRIPTION

Figure 1:
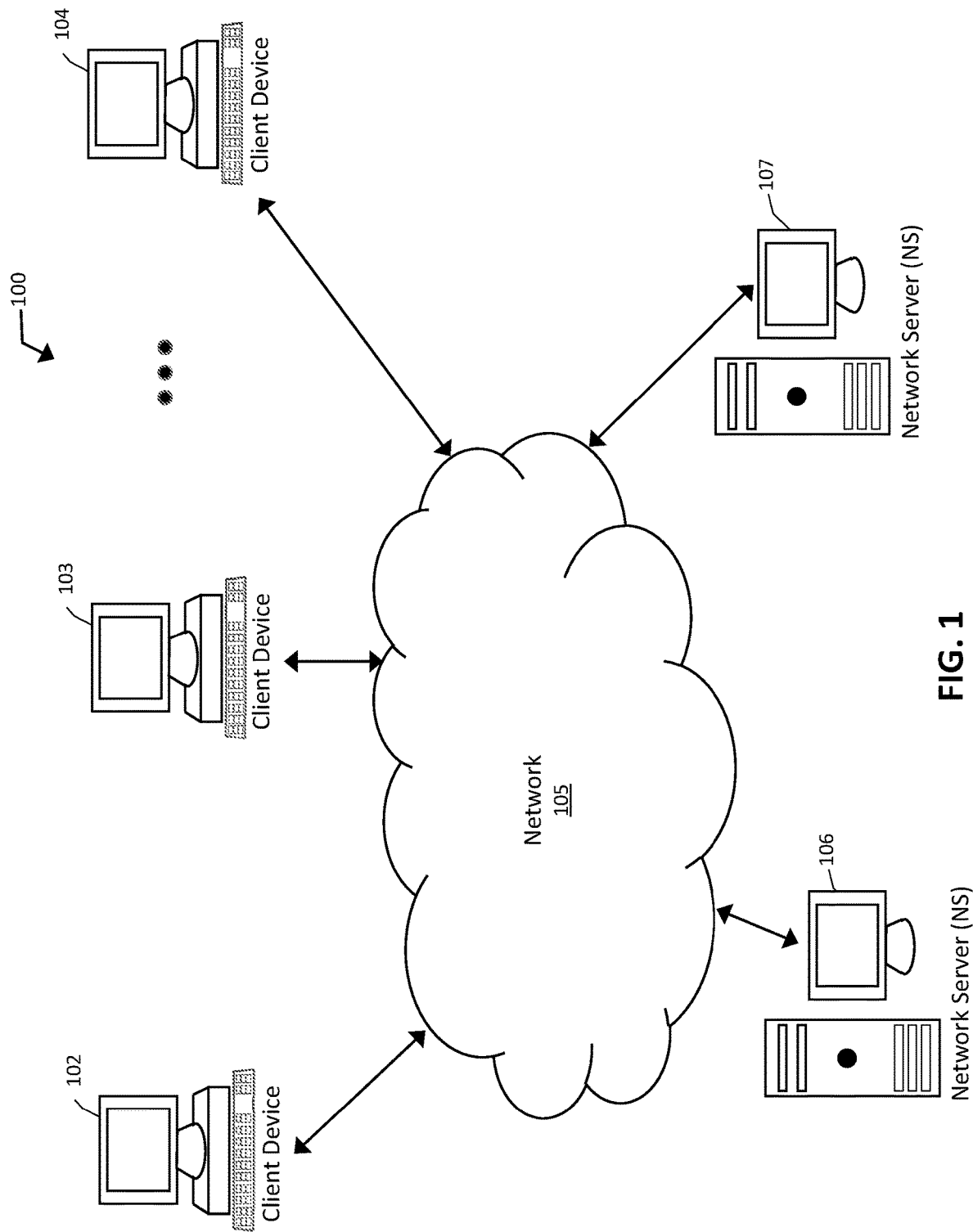
FIG. 1 is a block diagram depicting a computer-based system and platform in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 3 and 4) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/or (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

Figure 3:
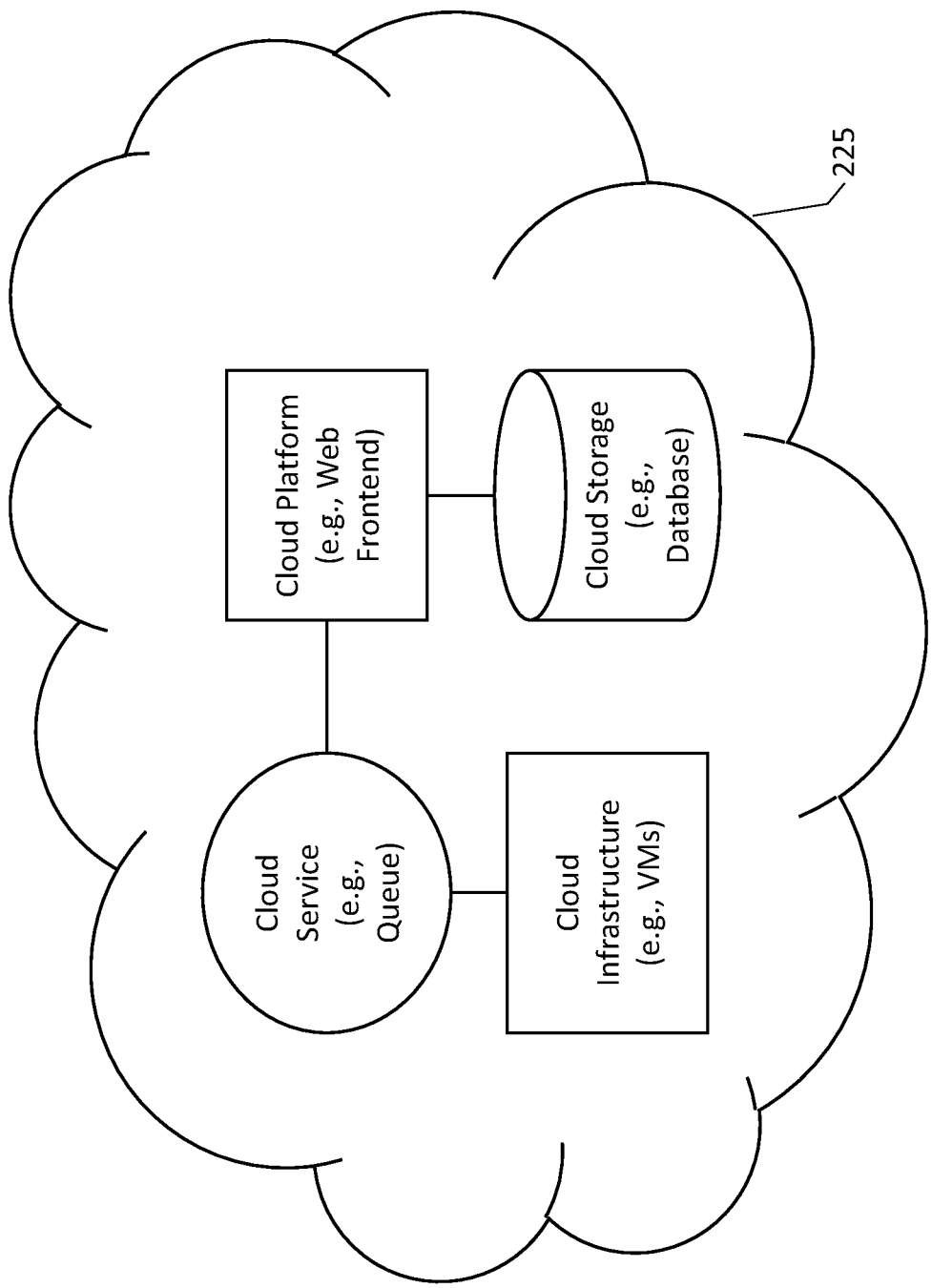
FIGS. 3 and 4 are diagrams illustrating implementations of cloud computing architecture/aspects with respect to which the disclosed technology may be specifically configured to operate, in accordance with one or more embodiments of the present disclosure.
Figure 4:
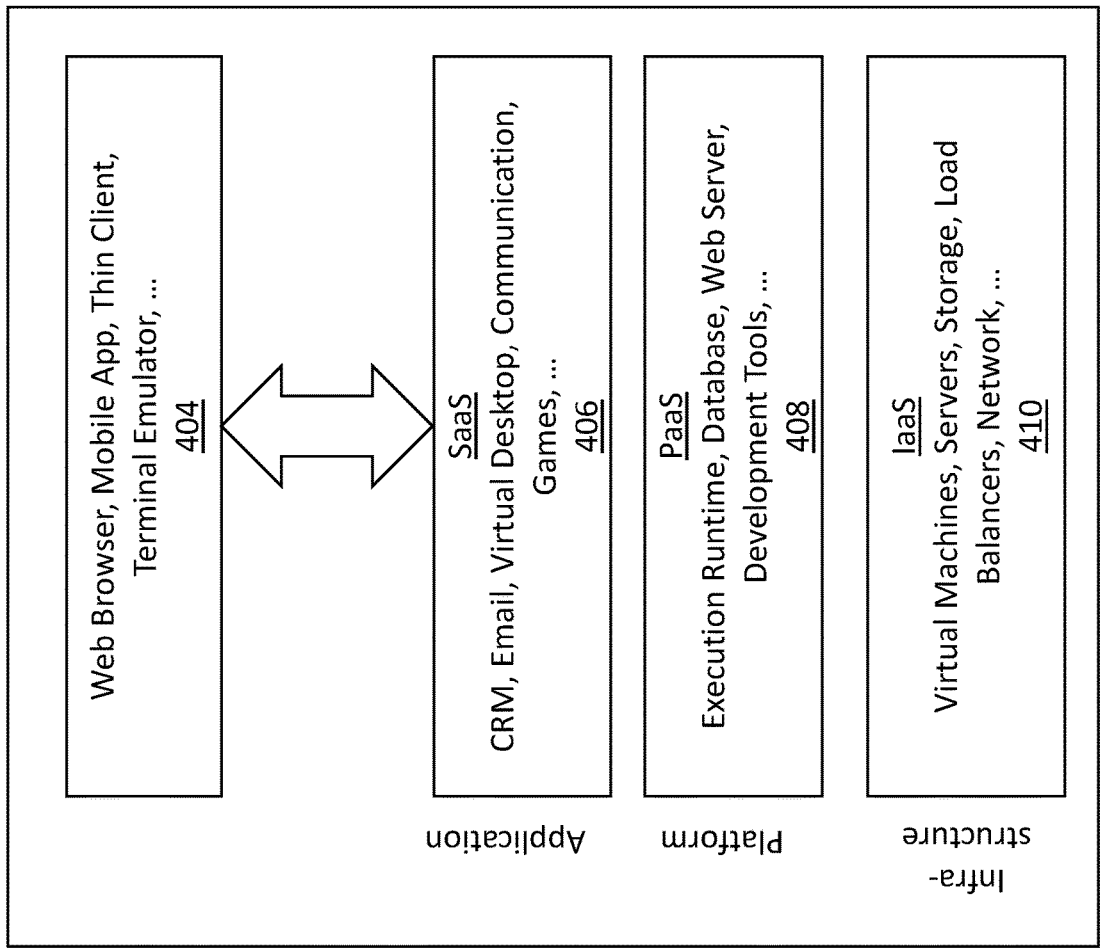

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). Examples of such cloud components are shown in FIGS. 3 and 4.

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRL-POOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIG. 1 is a block diagram depicting a computer-based system and platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 1, members 102-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer or machine readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 1, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 2:
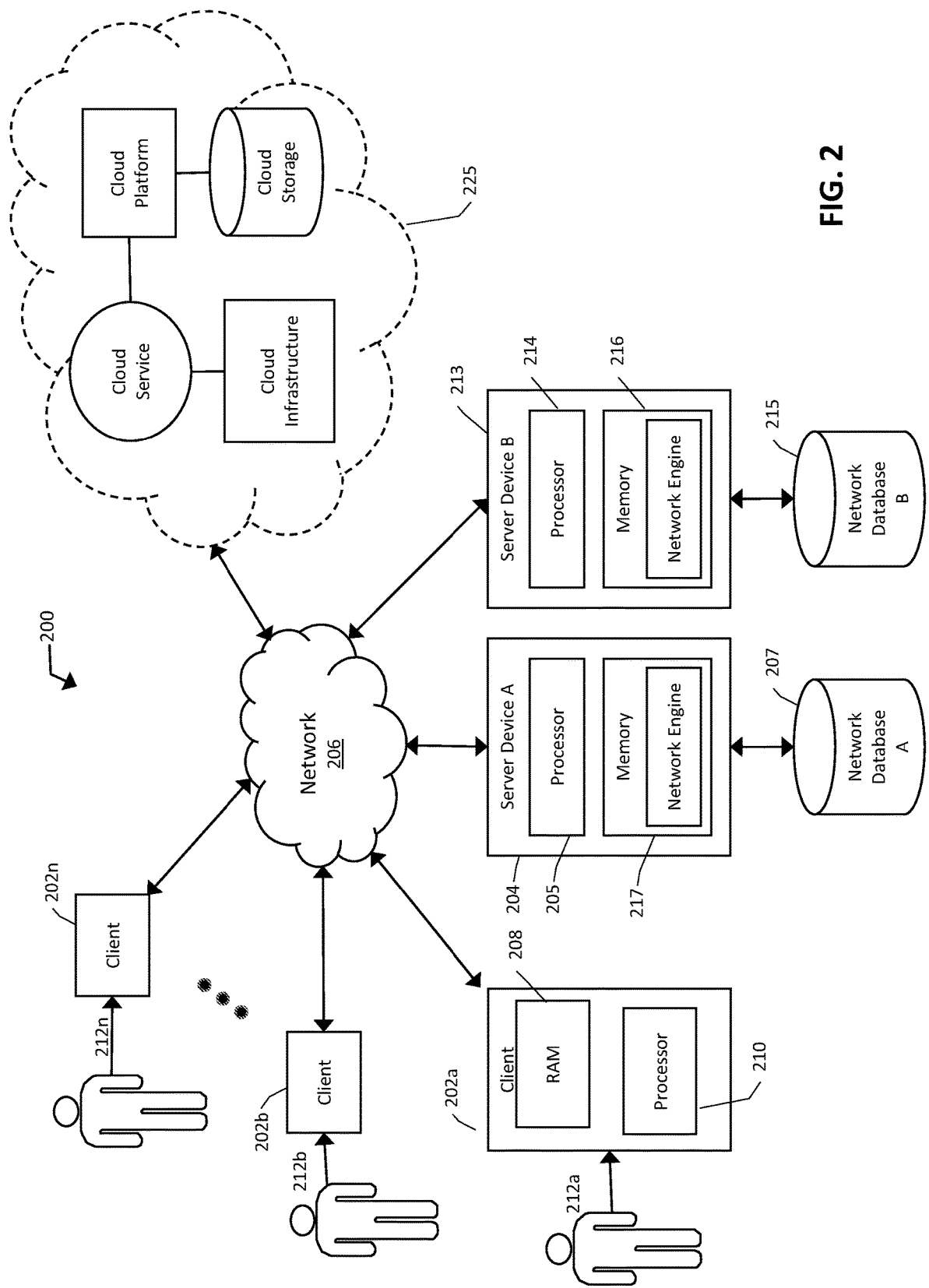
FIG. 2 is a block diagram depicting another computer-based system and platform in accordance with one or more embodiments of the present disclosure.

FIG. 2 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202a, 202b thru 202n shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202a-n may also comprise a number of external or internal devices such as a mouse, a CD-ROM, DVD, a physical or virtual keyboard, a display, or other input or output devices. In some embodiments, examples of member computing devices 202a-n (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202a-n may be specifically programmed with one or more application programs in accordance with one or more principles/methodologies detailed herein. In some embodiments, member computing devices 202a-n may operate on any operating system capable of supporting a browser or browser-enabled application, such as Microsoft™, Windows™, and/or Linux. In some embodiments, member computing devices 202a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202a-n, users, 212a-n, may communicate over the exemplary network 206 with each other and/or with other systems and/or devices coupled to the network 206. As shown in FIG. 2, exemplary server devices 204 and 213 may be also coupled to the network 206. In some embodiments, one or more member computing devices 202a-n may be mobile clients.

In some embodiments, at least one database of exemplary databases 207 and 2015 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

As also shown in FIGS. 2 and 3, some embodiments of the disclosed technology may also include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 4, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. FIGS. 3 and 4 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate.

Described herein are methods, systems, computer readable media, etc. for initiating, collecting, and delivering group gifts. Various embodiments described herein include technical aspects that reduce the number of clicks and/or actions taken by users to initiate, collect, and deliver a group gift. Likewise, reducing the number of clicks and/or actions taken by users of the embodiments described herein allows the users to more efficiently cause a group gift to be initiated, collected, and delivered. In addition, the backend systems, networks, servers, mobile electronic devices, etc. that are used to implement the methods, systems, computer readable media, etc. for initiating, collecting, and delivering group gifts may be taxed or used to a lesser degree because of the reduced interactions and clicks by a user.

For example, according to the embodiments described herein, participants in a group gift who wish to contribute to a group gift may contribute via a single interaction with a mobile electronic device. This reduced interaction is possible because of technical aspects of the embodiments described herein. Previously, in order to contribute to a group gift, an initiator of the gift may have to physically collect cash from contributors (another problem is some contributors may want change), collect checks from contributors (another problem is that checks may need to be cashed by the initiator), or secure promises from others to pay that must be followed up on. These methods of collecting from contributors is not only difficult and time consuming, but are difficult from a technical standpoint to reconcile into a single gift. That is, it is difficult for an initiator of a group gift to combine cash, checks, promises to pay, and other potential modes of payment into a single gift for the receiver of the gift. Providing an opportunity for a contributor to contribute to a group gift with a single action on a mobile electronic device saves much time and effort on the part of the initiator and the contributor.

Additionally, utilizing the single action for contributing as described herein solves technical problems that are presented by collecting contributions to a group gift through electronic means. For example, money may be shared through various types of sharing apps, such as Zelle™ Venmo™, Cashapp™, etc. Such apps may be utilized to collect contributions for a group gift. However, doing so requires the solicitation of such contributions individually, either in person, through a cash sharing app, or through some other electronic means of communication to solicit the contributions. Initiators and/or contributors may also have to share account or contact information with one another in order to solicit and/or receive the contributions.

Facilitating contribution to a group gift such that an initiator may easily send out solicitations and contributors may contribute with a single action through their respective mobile electronic devices as described herein solves technological problems with soliciting and receiving electronic contributions for a group gift—streamlining user interaction with a mobile electronic device and reducing the extent to which the resources of the mobile electronic device are used to solicit and/or contribute to a group gift—with technological solutions necessarily rooted in computer technology. For example, battery life and usage is a common concern for mobile electronic devices. Using the embodiment described herein, persons using a mobile electronic device to solicit contributions to a group gift and/or contribute to a group gift will use their mobile electronic device less, thereby preserving battery life. For example, as described herein, a contribution for a group gift may be solicited via a text message or push notification sent to a mobile electronic device. The user of the mobile electronic device may respond to the text message or push notification with a single action, minimizing the amount of time the user spends contributing the gift using the mobile electronic device and thereby preserving battery life. A relationship between a financial/bank account of the user of the mobile electronic device and the mobile electronic device itself may also be established before the text message or push notification is sent. In this way, the single action performed by the user with the mobile electronic device to respond to the solicitation also authorizes a deduction of funds from the users financial/bank account for contributing to the group gift. This taxes the mobile electronic device's processing capabilities and battery life less because the user is not required to log in to a financial app, enter account information, enter information related to the initiator of the gift or the receiver of the gift, etc.

In addition to taxing the battery and computing resources of the mobile electronic device less, the single interaction of the user also taxes network and backend resources less. For example, logging onto an electronic funds sharing app, specifying a receiver of funds (the solicitor of the group gift and/or the receiver of the group gift), entering an amount of funds to transfer, etc. all require communication between the mobile electronic device and one or more servers/backend devices. These communications all tax the computing and bandwidth resources of not only the one or more servers/backend devices, but also the communication networks that allow the mobile electronic device to communicate with the one or more servers/backend devices. Similarly, if cloud computing networks/devices are used instead of or in combination with other servers/backend devices, those resources may be similarly taxed by increased communications between mobile electronic devices and the cloud computing resources.

Similarly, computing resources may also be preserved using the embodiments described herein because reminders for contributing to a group gift may be reduced. The single action taken by a user on their electronic device may be, instead of an authorization to contribute to the group gift, a refusal to contribute to the group gift. When a user, via their electronic device, refuses or declines to participate in a group gift, that user and their associated device(s) may no longer be sent any reminders relating to the group gift. That the user can refuse via a single action reduces the resources taxed of the electronic device, and sending fewer reminders total by removing certain users/devices from a reminder reduces use of network and backend/server resources used to send out reminders.

Another technological problem solved by the various embodiments described herein is the problem of matching an amount of money contributed for a group gift to a physical gift. For example, it may be difficult to find a physical gift that costs the precise amount of money collected by the initiator. Further complicating this problem is that the initiator may not know how much money they will be able to collect until at or just before the moment the initiator looks to purchase the physical gift. Another problem is what to do with the money left over after purchasing a physical gift. According to the embodiments described herein, a physical gift purchase may be automatically determined for which there is enough money. That determination may be made in close proximity to the actual purchase of the physical gift, so that it is known exactly how much money has been contributed and is therefore available for purchasing a group gift. The physical gift may also be automatically purchased/ordered at a time sufficient to allow delivery of the physical gift to the receiver, but not more. In this way, a maximum amount of time may be used to wait for contributors to respond to invitations to contribute and for reminders to be sent such that more funds may be collected to use for a physical gift. In addition, the embodiments herein provide a technological solution for dealing with excess funds beyond what is required to purchase the physical gift. In particular, the excess funds may be automatically transferred to an account of the receiver, given to the receiver as a gift card, or otherwise be automatically transferred to the receiver, such that the initiator of the gift does not need to determine how to use, refund, or otherwise transfer the excess funds.

These embodiments, including the problems and solutions described herein, provide for improved functioning of mobile electronic devices, network resources, and back end servers (including cloud computing resources). For example, according to the various techniques described herein, a database, lookup table, or similar data structure of relationships between a user, their financial account(s), and their electronic device(s) (including, e.g., information about how to communicate with those devices such as phone numbers, user names, internet protocol (IP) addresses, media access control (MAC) address, or other type of identifying information used to communicate with a device) may be used to facilitate efficient inviting of contributors to contribute to a group gift and to facilitate efficient contributions to the group gift itself. These stored relationships may facilitate efficient contributions to a group gift by reducing how computing and networking resources are taxed because a contributor does not have to enter account information, a receiver of the gift, and/or the initiator of the group gift each time the user wishes to contribute to a group gift. Instead, the user may have previously set up an app for contributing to a group gift or otherwise authorized deductions from their financial account to contribute to a group gift such that they can authorize participation in a group gift (and thereby authorize a deduction from their associated financial account) with the single action described herein.

A lookup table, database, etc. may also include relationships between users. For example, relationships between users may include users who have one another in their contact lists, have been a part of group gifts before, have invited each other to a group gift before, or any other preexisting relationship between users. This lookup table, database, etc. may be stored on an initiator's electronic device or on a network storage device such as a server. These preexisting relationships may further facilitate efficient invitations to participate in a group gift by reducing how computing and networking resources are taxed because an initiator may have preexisting relationships with potential contributors to the gift. Accordingly, those who are to receive an invitation to contribute may be easily identified and selected by an initiator from a common contacts list with less information than would be necessary if the preexisting relationship was not established. For example, an initiator may invite someone by only identifying their name because that initiator may only have a preexisting relationship with one person of that name. Similarly, potential contributors may be stored in database, lookup table, etc. with group relationships, such as work, church, school, etc. (such groups may also be custom defined by a user). In this way, the user may not have to specify individual potential contributors for inviting to participate because the user can instead specify a group of potential contributors (e.g., everyone I work with) for a group gift. Because these relationships may be pre-established in a database, lookup table, etc. stored in a memory of an electronic device, those relationships can be looked up at later times without taxing computing resources to rebuild or re-determine the relationships each time. This represents a demonstrable technological improvement that allows a user to quickly and easily select, unselect, view, and/or otherwise interact with potential contributors to invite to contribute to a group gift. In other words, the embodiments herein provide for a particular manner of summarizing information by and on electronic devices, such that the electronic devices provide specific manners for selecting a limited set of potential contributors relevant to a user, rather than using conventional methods to determine and select potential contributors. Additionally, these embodiments provide for selecting these contributors in a same system/app/platform that can process payments. In this way, neither the initiator nor the contributors have to access another platform/system/app for responding to an invitation to contribute. Instead, the same system/app/platform that an initiator uses to select contributors and send invitations to contribute may be used to solicit contributions from the contributors and actually process the contributions for the group gift. In addition, the same system/app/platform may also be used to facilitate purchase of a physical gift for the receiver of the group gift and/or facilitate transfer of funds, gift cards, and/or selection of a gift by the receiver as described herein. These features represent technological improvements over other methods of facilitating group gifts that may require multiple systems, platforms, and/or apps to solicit and collect contributions from a variety of contributors using mobile electronic devices.

Figure 5:
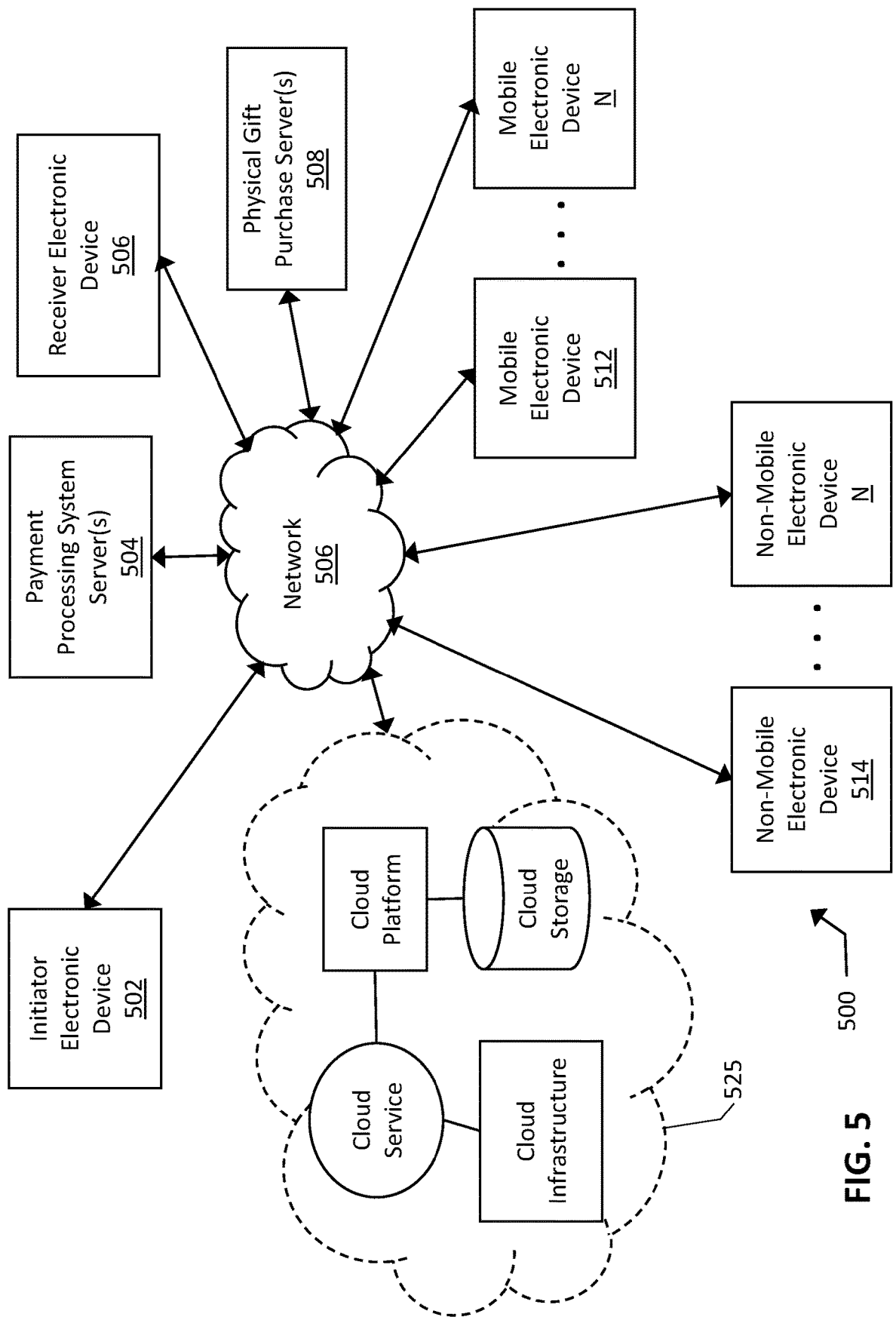
FIG. 5 is a block diagram of a system for initiating, collecting, and delivering group gifts in accordance with one or more embodiments of the present disclosure.

FIG. 5 is a block diagram of a system 500 for initiating, collecting, and delivering group gifts in accordance with one or more embodiments of the present disclosure. The system 500 includes an initiator electronic device(s) 502, payment processing system server(s) 504, a receiver electronic device 506, physical gift purchase server(s) 508, a plurality of mobile electronic devices 512 . . . N, a plurality of non-mobile electronic device(s) 514 . . . N, and one or more cloud components 525. The one or more cloud components 525 may be or may include components of the cloud components 225 shown in FIGS. 2-4 and described herein. The various processes described herein may be implemented by more, less, and/or any combination of the devices, components, etc. shown in FIG. 5. Any of the processes or functions described herein may also be implemented on different devices than those shown in FIG. 5. For example, some or all parts of the processes described herein may be implemented on any of the server(s) 504, 508 and/or the one or more cloud components 525. That is, the one or more cloud components 525 may function similarly to one or more of the servers 504, 508, at least with respect to the embodiments described herein. Some or all parts of the processes described herein may also be implemented on any of the initiator electronic device 502, the receiver electronic device 506, the mobile electronic devices 512 . . . N, and/or the non-mobile electronic devices 514 . . . N.

In the example of FIG. 5, the initiator electronic device(s) 502, the payment processing system server(s) 504, the receiver electronic device 506, the physical gift purchase server(s) 508, the plurality of mobile electronic devices 512 . . . N, the plurality of non-mobile electronic device(s) 514 . . . N, and the one or more cloud components 525 may communicate with one another over the network 506. Communications may be, for example, a request from the initiator electronic device 502 to the payment processing system server(s) 504 to initiate a group gift, invitations from the payment processing system server(s) 504 to the plurality of mobile electronic devices 512 . . . N and/or the plurality of non-mobile electronic device(s) 514 . . . N to contribute to a group gift, and/or responses to the invitations sent from the plurality of mobile electronic devices 512 . . . N and/or the plurality of non-mobile electronic device(s) 514 . . . N to the payment processing system server(s) 504. The initiator electronic device(s) 502, the plurality of mobile electronic devices 512 . . . N, and/or the plurality of non-mobile electronic device(s) 514 . . . N may function similarly to and/or may have components similar to the client devices 102, 103, 104 of FIG. 1 and/or the client devices 202a, 202b, and 202n of FIG. 2. The payment processing system server(s) 504 and/or the physical gift purchase server(s) 508 may function similarly to and/or may have components similar to the network servers 106, 107 of FIG. 1 and/or the server devices 204, 213 (including the network databases 207, 215) of FIG. 2.

As described further herein, invitations to contribute to a group gift may be sent from the payment processing system server(s) 504 (and/or the one or more cloud computing components 525) to the plurality of mobile electronic devices 512 . . . N and/or the plurality of non-mobile electronic device(s) 514 . . . N. For example, the invitations may be a push notification or a text message to a mobile phone, such as a smart phone. An application (app) installed on the mobile phone may be configured to received push notifications that push information related to the information to the phone and cause a dialog to appear on a display of the mobile phone, such as those shown in and described below with respect to FIGS. 7A and 7C. A text message may be sent to a mobile phone that is displayed on a mobile phone, such as those shown in and described below with respect to FIGS. 7B and 7D. In various embodiments, other types of invitations and/or electronic devices may be utilized. For example, a mobile electronic device may be a laptop, tablet, or any other type of mobile electronic device. An invitation may be sent via email, a web messaging service (e.g., iMessage™, WhatsApp™, etc.), or any other mode of communication.

The plurality of mobile electronic devices 512 . . . N and/or the plurality of non-mobile electronic device(s) 514 . . . N may respond to the invitations to participate in the group gift in accordance with the medium or mode through which the invitation was received. For example, if the invitation was a text message, a user may respond using their electronic device with a text message. In another example, if the invitation is sent as a push notification, the user may respond with their electronic device by selecting a dialog option associated with the push notification. If the invitation is an email, the user may respond by clicking a link in the email or by responding to the email. As described herein, a response to an invitation may be a single action performed by the user, such as a single selection, single text message, or other single response, without having to log in, provide financial information, take other steps, etc.

The responses from the plurality of mobile electronic devices 512 . . . N and/or the plurality of non-mobile electronic device(s) 514 . . . N may be sent via the network 506 to the payment processing system server(s) 504. If a response indicates an approval to contribute to the group gift, the payment processing system server(s) 504 can cause funds to be deducted from an account associated with the device and user who approved the participation. If the response indicates a refusal, the payment processing system server(s) will not deduct any funds, and may not send any reminders to the device and/or user from which the refusal was received. Once the time period for contributing to the gift has elapsed/expired, the payment processing system server(s) 504 may communicate with the physical gift purchase server(s) 508 to order a physical gift with the funds contributed to the group gift. The payment processing system server(s) 504, after ordering the physical gift, may also send a message to the receiver electronic device 506. The message may include, for example, custom content relating to a holiday or occasion that is the reason for the gift, may include information about a gift card or other way to electronically redeem or claim a gift sent as part of the group gift. The message may also indicate that a particular amount of funds have been automatically deposited into an account of the receiver, and may include information about the physical gift purchased. In various embodiments, a physical gift may not be ordered, by all the funds contributed to the group gift may be transferred to the receiver's account, given to the receiver as a gift card, etc.

FIG. 6 is a flowchart illustrating a process 600 for initiating, collecting, and delivering group gifts in accordance with one or more embodiments of the present disclosure. The process 600 includes operations that may be taken, for example, by a computing device such as the payment processing system server(s) 504 and/or the one or more cloud computing components 525 of FIG. 5 to initiate, collect, and deliver a group gift. In various embodiments, each and every one of the elements of the process 600 may be performed by components of a payment processing system. In this way, the payment processing system may be used to efficiently solicit contributions to a group gift and process contributions for the group gift. As described herein, such embodiments provide for improved functioning of computerized systems because a contributor to the group gift may contribute to the group gift with a single action, and an initiator of a group gift may more easily invite others to contribute to a group gift.

At an operation 602, a request is received to initiate a group gift from an initiator electronic device, such as the initiator electronic device(s) 502 of FIG. 5. The request may include various types of information input by a user into their initiator electronic device. For example, the request may include a gift date on which the group gift should be sent to a receiver of the gift. The gift date may coincide with a holiday, birthday, last day of work, anniversary, any other day of note, or may be any day specified by the requestor. The request may also specify the type of gift desired to be sent to the receiver (e.g., type of physical gift, type of gift card, money, rewards points, etc.). The request may also include other parameters for the group gift. For example, the request may include specified denominations to include in the invitations for others to contribute (e.g., the request may specify to ask potential contributors for $5, $10, $15, or $20, or may give them the choice between one or more denominations). The request may also specify how the invitations should solicit a donation. For example, the request may specify a preference for text messages, push notifications, and/or emails to solicit contributions, or may specify invitations to be used such as the examples shown in FIGS. 7A-7D. The request may specify that custom denominations may be contributed, may specify types of physical or other gifts as options for the group gift so that contributors may vote on a preference for the type of gift, or may specify any other type of option for the invitations and/or group gift. The request may also specify an end date for a period of time in which contributions may be made, or the end date may be automatically determined based on the gift date specified. For example, the end date may be automatically determined based on an expected delivery time of a physical gift, or if no physical gift is to be determined, the end date may be at or just before the moment that a message with information about the gift is sent to the receiver electronic device, such as the gift receiver electronic device 506 of FIG. 5. The request to initiate the group gift may also include indications identifying a recipient for the group gift associated with the gift receiver electronic device. The payment processing system server, for example, may have stored an association between the recipient and the recipient's electronic device, such that the request may only specify the recipient and the recipient's electronic device is automatically determined based on the association. Similarly, the request may specify or indicate the potential contributors to which invitations should be sent, and the electronic devices to which those invitations may be sent may similarly be determined based on associations stored on a memory to which the payment processing system server has access to. The electronic devices may be mobile devices or non-mobile devices. In various embodiments, an invitation may be sent not to a particular device, but to, for example, an email address, messaging address, or other communication protocol that does not specify a device. Other communication protocols, such as text messages or push notifications may specify a particular device (e.g., using a phone number, IP address and/or MAC address for a device on which an app is installed, etc.).

Accordingly, at an operation 604, based on information indicated in the request to initiate a group gift, a plurality of electronic devices is determined to which invitations are sent to contribute to the group gift. In various embodiments, different types of devices or differently configured devices may be determined in order to send different types of invitations to. For example, a first type of invitation that allows responding with a single action may be sent to mobile devices as a text message or push notification as described herein. A second type of invitation, such as to an email address, may be sent to mobile or non-mobile devices that are not already configured or set up by the user to authorize contributions to a group gift. Those invitations may invite a potential contributor to set up an account, install an app, or otherwise configure their electronic devices so that in the future they can respond to invitations with a single action. In various embodiments, if an account with the payment processing system is already configured, even an email invitation may be responded to with a single action. For example, the email invitation may include one or more links that, when selected, may automatically cause a contribution to the group gift. Accordingly, different types of invitations may be sent to potential contributors based on what type of device they have, what is known about the potential contributors (e.g., email address, phone number, app installed on phone, etc.), and/or whether the potential contributor is already known to the payment processing system and has an account configured for single action contributions to group gifts.

At an operation 606, invitations to the electronic devices are sent. The invitations are sent according to the type of invitation and what is known about the potential contributors and their electronic devices as described herein. For example, invitations sent to mobile electronic devices, such as the mobile electronic devices 512 . . . N of FIG. 5 may be in the form of a text message and/or a push notification. As described herein, the push notifications or text messages may prompt a user/potential contributor to respond with a single action whether the user would like to contribute to the group gift or not. The single action may not include other interactions with a mobile device, such as unlocking the mobile device to access push notifications and/or text messages, selecting a text message or other messaging app to view a text message invitation, selecting an email app to access an email invitation, opening an email to view an email invitation, etc. Rather, the single action as described herein refers to actions taken specifically related to contributing (or declining/refusing to contribute) to a group gift. For example, a single action to contribute to a group gift may not include inputting financial account information of the contributor and/or recipient of the group gift, as that information may be already known to the payment processing system when the group gift invitations are configured by the payment processing system based on the request from the initiator of the group gift. As another example, the single action to contribute may not include logging into an account, as prior configuration by the potential contributor may establish the electronic device as authorized to make contributions to group gifts from a known account without logging into an account with the payment processing system.

At an operation 608, first responses from each of a first subset of the plurality of electronic devices to which invitations were sent, where the first responses indicate an approval to contribute to the group gift are received. The first responses may be received from mobile devices, non-mobile devices, or some combination thereof. The response may be based on a single action of the user, as described herein. The approval may include an authorization to deduct from or charge to an account associated with a respective one of the first subset of the plurality of mobile electronic devices. In other words, the responses approving a contribution to the group gift cause funds to deducted from or charged to an account associated with the user, providing that the user has linked that account to their mobile device by, for example, previously configuring and authorizing the mobile device, an app on the mobile device, etc. The response to authorize a contribution may also include, for example, an amount of money that should be contributed, a personalized message to a recipient of the group gift, a preference or vote of the type of gift to send to the recipient, or any other type of information. Any personalized messages from may be incorporated into a message sent to the gift receiver electronic device detailing the group gift on the gift date. Personalized messages may include personalized text, pictures or videos (including pictures or videos taken by a mobile electronic device of a contributor), etc.

At an operation 610, second responses are received from each of a second subset of the plurality of electronic devices indicating a refusal to contribute to the group gift. The second responses may be received from mobile devices, non-mobile devices, or some combination thereof.

One or more messages indicating whether users associated with devices that sent the first or second responses may be sent to the initiator electronic device. In other words, the initiator may be notified whether particular users have responded to the invitations, and/or how particular users responded to the invitations (e.g., whether they refused or approved a contribution, how much a user contributed, how particular users voted to express a preference for type of gift, etc.). In various embodiments, certain information about how users responded to the invitations may not be provided to the initiator. For example, whether a user approved or refused to contribute may be kept from an initiator so that the initiator does not know who contributed or not to the group gift. Similarly, a message sent to the recipient may not indicate who did not contribute to the group gift. The message sent to the recipient of the group gift may or may not indicate who actually did contribute to the group gift.

At an operation 612, reminders are sent to a third subset of electronic devices after a first predetermined amount of time after the invitations are sent or on a predetermined date indicated in the request to initiate the group gift. The third subset of electronic devices are associated with invitations and users who have not yet responded to the invitations to contribute to the group gift. In various embodiments, additional reminders may be sent after another predetermined amount of time or on a second predetermined date. In various embodiments, the predetermined amount of time or the predetermined dates used to determine when to send reminders may be automatically set by the payment processing system, rather than indicated by the initiator in the request to initiate the group gift. Additionally, responses (e.g., to approve a contribution to the group gift, to refuse to contribute to the group gift) may be received from electronic devices after one or more reminders are sent out. If received, those electronic devices that were originally categorized as one of the third subset of devices that have not responded may then be categorized as one of the first subset (e.g., those who approved a contribution) or one of the second subset (e.g., those who refused to contribute). In this way, any subsequent reminders will not be sent to those devices that have already responded to an invitation. As discussed below with respect to FIG. 8, users may delegate another user and/or electronic device to respond to an invitation to contribute to a group gift on their behalf. In such scenarios, reminders may be sent to a delegated electronic device instead of or in addition to the device on which the delegation was specified. Likewise, if a delegated device responds to an invitation (either with an approval or refusal to contribute), the system may consider it as if the delegator device has responded, and therefore not send either device any further reminders after receiving the response. If a reminder is a final reminder before the group gift is sent to the recipient and/or before a physical gift purchase is initiated, the final reminder may include an indication that this is the last opportunity to participate in contributing to the group gift, and may also include the date and/or time on which no further contributions may be made to the group gift.

At an operation 614, a physical gift purchase is initiated a predetermined amount of time prior the gift date. Funds deducted from or charged to accounts associated with at least the first subset of the plurality of mobile electronic devices (e.g., those who approved a contribution to the group gift) may be used to purchase the physical gift. The predetermined amount of time prior the gift date may be automatically calculated to facilitate delivery of the physical gift purchase to the receiver of the gift on or before the gift date, and therefore may be based on an estimated shipping time to deliver the physical gift. In other words, a physical gift purchase is initiate such that there is time for the physical gift to be delivered to the recipient in time for the gift date. The physical gift purchase may be selected automatically to use as much of the funds as possible, or may be selected to use only a predetermined amount or percentage of the funds collected for the group gift, so that the rest of the funds may be delivered as a gift card, funds transfer to an account, or otherwise provided to the recipient not as a physical gift (e.g., funds redeemable through a rewards network of a payment processing system).

At an operation 616, a message is sent on the gift date to a gift receiver electronic device. The message may include information about a monetary gift including funds contributed by those who approved of a contribution to the group gift. In various embodiments, the receiver electronic device may be associated with an individual, group, company, or any other entity. In various embodiments, the message may be sent to multiple gift receiver devices, such as where the group gift is for a group of people (e.g., the group gift is distributed amongst more than one person). The monetary gift may be a remainder of the funds deducted from or charged to accounts associated with at least the first subset of the plurality of mobile electronic devices that was not used for the physical gift purchase (if a physical gift purchase was made using the funds). The message may also include a link to a webpage with instructions for using the funds or redeeming the funds for a reward, such as airline miles. The webpage may also include physical gifts from which the receiver may choose, and/or may include options for transferring the funds to an account associated with the receiver. In some embodiments, the funds may be automatically transferred to an account associated with the receiver, and the message may merely inform the receiver/recipient that the funds have been transferred and/or the amount of funds transferred.

In various embodiments, the request to initiate the group gift may include a specified type of occasion and type of physical gift for the physical gift purchase. The payment processing system may then determine a creative theme to apply to the message sent to the gift receiver electronic device based at least in part on the type of occasion or the type of physical gift. In various embodiments, the request may include a specified type of occasion and does not specify a physical gift for purchase. However, the type of physical gift may be automatically selected by the payment processing system using based at least in part on the type of occasion or other information input as part of the request to initiate the group gift. For example, a birthday occasion type may cause the system to purchase a cake for delivery on the gift date, while an anniversary may cause the system to purchase flowers for delivery on the gift date. In this way, the system may select a physical gift for purchase without any user (either the initiator, contributor, or recipient) selecting a type of physical gift for purchase.

The payment processing system may also send, to the initiator electronic device and/or the first subset of the plurality of mobile electronic devices (e.g., the device that approved a contribution to the group gift), a confirmation message indicating that the physical gift has been delivered and/or that the message has been sent to the gift receiver electronic device. In this way, the contributors and initiator receive confirmation that the group gift has been delivered.

FIGS. 7A-7D are example user interfaces of a mobile electronic device for receiving a single action for contributing to a group gift in accordance with one or more embodiments of the present disclosure.

Figure 7B:
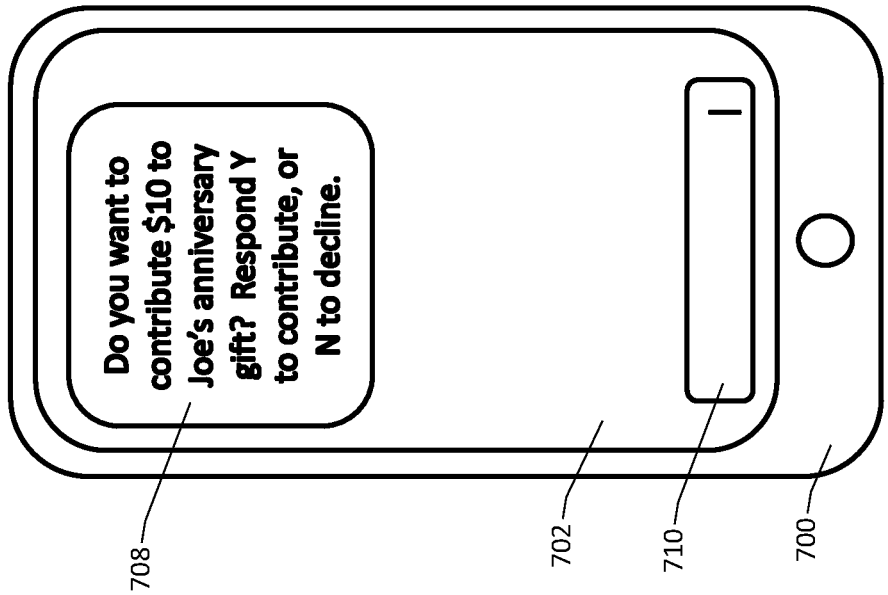
FIGS. 7A-7D are example user interfaces of a mobile electronic device for receiving a single action for contributing to a group gift in accordance with one or more embodiments of the present disclosure.
Figure 7A:
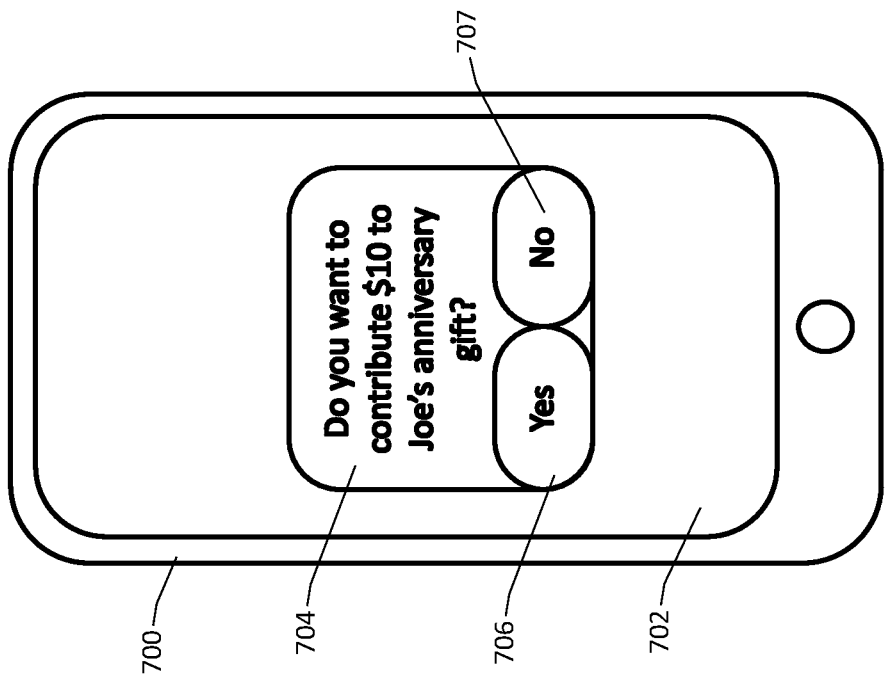
Figure 7D:
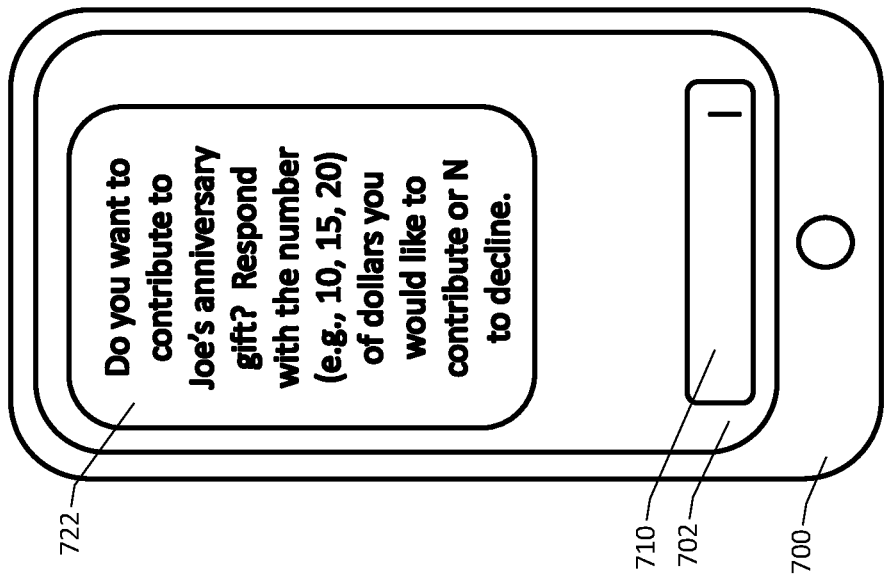
Figure 7C:
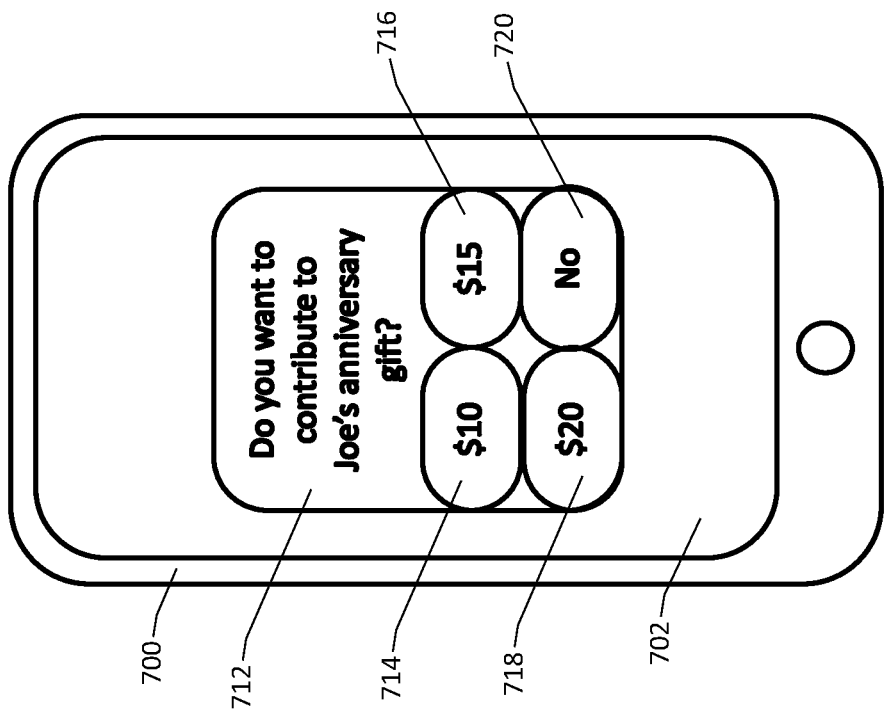

A push notification invitation, examples of which are shown in FIGS. 7A and 7C, may be responded to by selecting a response to a prompt presented in the push notification. Selecting that response may constitute a single action. For example, FIG. 7A shows a mobile electronic device 700 with a graphical user interface (GUI) 702. A push notification 704 is displayed on the GUI 702, and the user may select options 706 or 707 as a single action to indicate whether the user would like to contribute to a group gift or not. In FIG. 7C, the GUI 702 displays a push notification 712 that allows the user to select different denomination options 714, 716, 718 or select option 720 that they would not like to contribute. In other words, the single action in response to the push notification 712 may be to select an amount to contribute to the group gift.

FIGS. 7B and 7D demonstrate a text message that may appear on the GUI 702 for the user to respond to with a single action. In FIG. 7B, the user may respond with a "Y" or "N" text message to indicate whether they would like to contribute or no. In the examples of FIGS. 7B and 7D, typing a text into a dialog 710 and sending the text to respond to text message 708 and 722 are considered a single action. In FIG. 7D, the user may respond with "N" if they do not wish to contribute or may respond with a denomination amount they would like to contribute. These text message responses are also considered single actions for purposes of this disclosure. In various embodiments, the input of the text messages may be done with typing on a keyboard displayed on the GUI or may be input using voice recognition.

FIG. 8 is a flowchart illustrating a process 800 for delegating responsibility for responding to an invitation to participate in a group gift in accordance with one or more embodiments of the present disclosure. The process 800 includes operations that may be taken, for example, by a computing device such as the payment processing system server(s) 504 and/or the one or more cloud computing components 525 of FIG. 5 to initiate, collect, and deliver a group gift. In various embodiments, each and every one of the elements of the process 800 may be performed by components of a payment processing system. In this way, the payment processing system may be used to efficiently solicit contributions to a group gift and process contributions for the group gift, even where certain users have delegated responsibility for responding to invitations to participate. As described herein, such embodiments provide for improved functioning of computerized systems because a contributor to the group gift may contribute to the group gift with a single action, and an initiator of a group gift may more easily invite others to contribute to a group gift.

At an operation 802, a delegation of responsibility is received from an electronic device for responding to an invitation to contribute to a group gift. The delegation may represent an authorization from a first user to a second user to respond to the invitation. The second user may be associated with a second electronic device, so the system may determine, at an operation 804 based on the delegation, a delegated mobile electronic device associated with the second user to send an invitation to. The delegated mobile electronic device may or may not have been a part of the original electronic devices to which the invitations to contribute to the group gift were originally sent.

At an operation 806, an invitation to contribute to the group gift is sent to the delegated mobile electronic device. At an operation 808, a response is from the delegated mobile electronic device to contribute or not contribute to the group gift. When the responsibility for responding to the invitation is delegated, a response approving a contribution from a delegated device may cause funds to be deducted from or charged to an account associated with the first user (e.g., the delegator) and/or the first electronic device (e.g., device from which the delegation of responsibility for responding was received). In this way, when someone delegates the responsibility to respond, their account is still deducted from even if another user/person is the one responding to the invitation.

In various embodiments, the payment processing system may also facilitate sending of thank you notes for the group gift. The receiver of the gift may cause thank you messages to be sent to each person who contributed to the group gift. In various embodiments, the messages may be automatically personalized to the contributor, or may be customized by the receiver of the group gift to personalize the thank you messages. Since the payment processing system already knows the identities and devices associated with all of the contributors to a group gift, thank you messages to each of those contributors may be facilitated.

In various embodiments, because a payment processing system is already used, anyone who has a payment method or account (e.g., bank account, credit card, etc.) with that payment processing system may be easily incorporated into a group gift, either as an initiator, contributor, and/or receiver. For example, someone with a credit card that is active and registered for use with the payment processing system may already have information known to the payment processing system, such as their email address. Accordingly, for example, when an initiator of a group gift is specifying potential contributors and/or recipients for a group gift, the initiator may only have to enter some of the information that is already known by the payment processing system, such as an email address, name, workplace, or some other piece of known information. Since those persons and their financial accounts are already known to the payment processing system, those persons may never have to separately input information related to their financial accounts, credit cards, etc. In other words, once the payment processing system identifies a user (to be a contributor, recipient, etc.), any funds to contribute or received by a recipient may be automatically charged to, deducted from, and/or credited to a known account. Such functionality provides an efficient and easy process for initiating, collecting, and delivering group gifts as described herein throughout.

At least some aspects of the present disclosure will now be described with reference to the following numbered clauses.

Clause 1. A method comprising: receiving, by one or more processors that are each part of a payment processing system, a request to initiate a group gift from an initiator electronic device, wherein the request comprises a gift date on which the group gift should be sent to a receiver of the gift; determining, by the one or more processors, a plurality of mobile electronic devices to send a first type of invitations to contribute to the group gift and determining a plurality of non-mobile electronic devices to send a second type of invitations to contribute to the group gift; sending, by the one or more processors, the first type of invitations to the plurality of mobile electronic devices and the second type of invitations to the non-mobile electronic devices, wherein each of the first type of invitations comprises a push notification to an application (app) on each of the plurality of mobile electronic devices or a text message to each of the plurality of mobile electronic devices, and further wherein the push notification or text message of each of the first type of invitations prompts a user to respond with a single action whether the user would like to contribute or not; receiving, by the one or more processors, a first response from each of a first subset of the plurality of mobile electronic devices indicating an approval to contribute to the group gift, wherein the approval comprises an authorization to deduct from or charge to an account associated with a respective one of the first subset of the plurality of mobile electronic devices; receiving, by the one or more processors, a second response from each of a second subset of the plurality of mobile electronic devices indicating a refusal to contribute to the group gift; sending, by the one or more processors, after a first predetermined amount of time after the invitations are sent or on a predetermined date indicated in the request to initiate the group gift, a reminder to each of a third subset of the plurality of mobile electronic devices that have not responded to the first type of invitations; initiating, by the one or more processors, a second predetermined amount of time prior the gift date, a physical gift purchase as part of the group gift using funds deducted from or charged to accounts associated with at least the first subset of the plurality of mobile electronic devices, wherein the second predetermined amount of time is configured to facilitate delivery of the physical gift purchase to the receiver of the gift on or before the gift date; and sending, by the one or more processors, on the gift date, a message to a gift receiver electronic device comprising information about a monetary gift, wherein the monetary gift is a remainder of the funds deducted from or charged to accounts associated with at least the first subset of the plurality of mobile electronic devices that was not used for the physical gift purchase.

Clause 2. The method of clause 1, wherein the request to initiate the group gift further comprises a first indication identifying a recipient for the group gift associated with the gift receiver electronic device, and wherein the request to initiate the group gift further comprises at least one second indication identifying a plurality of potential contributors for the group gift associated with the plurality of mobile electronic devices and the plurality of non-mobile devices.

Clause 3. The method of clause 1, wherein the first type of invitations each comprise a push notification, the first response from each of the first subset of the plurality of mobile electronic devices comprises a response to a prompt presented in the push notification, and the single action comprises a selection of an amount to contribute to the group gift.

Clause 4. The method of clause 1, wherein the first type of invitations each comprise a text message, the first response from each of the first subset of the plurality of mobile electronic devices comprises a response to a prompt presented in the text message, and the single action comprises a return text message indicating an amount to contribute to the group gift.

Clause 5. The method of clause 1, further comprising receiving, by the one or more processors, the first response from at least one of the third subset of the plurality of mobile electronic devices after the sending of the reminder.

Clause 6. The method of clause 5, further comprising switching, by the one or more processors, the at least one of the third subset of the plurality of mobile electronic devices from which the first response was received from the third subset to the first subset before the initiating of the physical gift purchase and the sending of the message to the gift receiver electronic device.

Clause 7. The method of clause 1, further comprising receiving, by the one or more processors, the second response from at least one of the third subset of the plurality of mobile electronic devices after the sending of the reminder.

Clause 8. The method of clause 7, further comprising: switching, by the one or more processors, the at least one of the third subset of the plurality of mobile electronic devices from which the second response was received from the third subset to the second subset before the initiating of the physical gift purchase and the sending of the message to the gift receiver electronic device; and sending, by the one or more processors, a subsequent reminder to each of the third plurality of mobile electronic devices to contribute to the group gift after the switching, such that the subsequent reminder is not sent to the at least one of the third subset of the plurality of mobile electronic devices from which the second response was received.

Clause 9. The method of clause 8, wherein the subsequent reminder comprises at least one of an indication that this is a final reminder to contribute to the group gift or an indication of the latest date on which a contribution to the group gift may be made.

Clause 10. The method of clause 1, further comprising determining the second predetermined amount of time based on an estimated shipping time to deliver the physical gift.

Clause 11. The method of clause 1, wherein the request to initiate the group gift comprises a type of occasion and a type of physical gift for the physical gift purchase, and wherein the method further comprises determining, by the one or more processors, a creative theme to apply to the message sent to the gift receiver electronic device based at least in part on the type of occasion and the type of physical gift.

Clause 12. A system comprising: a memory; at least one processor coupled to the memory, the processor configured to: receive a request to initiate a group gift from an initiator electronic device, wherein the request comprises a gift date on which the group gift should be sent to a receiver of the gift; determine a plurality of mobile electronic devices to send invitations to contribute to the group gift; send the invitations to the plurality of mobile electronic devices, wherein each of the invitations comprises a push notification to an application (app) on each of the plurality of mobile electronic devices or a text message to each of the plurality of mobile electronic devices; receive a first response from each of a first subset of the plurality of mobile electronic devices indicating an approval to contribute to the group gift, wherein the first response is sent as a result of a single action by each user of the first subset of the plurality of mobile electronic devices; receive a second response from each of a second subset of the plurality of mobile electronic devices indicating a refusal to contribute to the group gift; send, after a first predetermined amount of time after the invitations are sent or on a predetermined date indicated in the request to initiate the group gift, a reminder to each of a third subset of the plurality of mobile electronic devices that have not responded to the invitations; initiate, a second predetermined amount of time prior to the gift date, a physical gift purchase as part of the group gift using funds deducted from or charged to accounts associated with at least the first subset of the plurality of mobile electronic devices, wherein the second predetermined amount of time is configured to facilitate delivery of the physical gift purchase to the receiver of the gift on or before the gift date; and send, on the gift date, a message to a gift receiver electronic device comprising information about a monetary gift, wherein the monetary gift is a remainder of the funds deducted from or charged to accounts associated with at least the first subset of the plurality of mobile electronic devices that was not used for the physical gift purchase.

Clause 13. The system of clause 12, wherein the processor is further configured to: receive, along with the first response from each of the first subset of the plurality of mobile electronic devices, a personalized message to a recipient of the group gift; and incorporating the personalized message from each of the first subset of the plurality of mobile electronic devices into the message sent to the gift receiver electronic device.

Clause 14. The system of clause 12, wherein the physical gift is a first physical gift, and further wherein the message to the gift receiver electronic device comprises a hyperlink which, when selected by a user, causes the gift receiver electronic device to navigate to a webpage or application that receives a selection of an available gift card or a second physical gift.

Clause 15. The system of clause 14, wherein at least one of the available gift card and the second physical gift are available through a payment processing entity's reward network.

Clause 16. A non-transitory computer readable medium having instructions stored thereon that, upon execution by a computing device, cause the computing device to perform operations comprising: receiving a request to initiate a group gift from an initiator electronic device, wherein the request comprises a gift date on which the group gift should be sent to a receiver of the gift; determining a plurality of mobile electronic devices to send invitations to contribute to the group gift; sending the invitations to the plurality of mobile electronic devices, wherein each of the invitations comprises a push notification to an application (app) on each of the plurality of mobile electronic devices or a text message to each of the plurality of mobile electronic devices; receiving a first response from each of a first subset of the plurality of mobile electronic devices indicating an approval to contribute to the group gift; receiving a second response from each of a second subset of the plurality of mobile electronic devices indicating a refusal to contribute to the group gift; sending, after a first predetermined amount of time after the invitations are sent or on a predetermined date indicated in the request to initiate the group gift, a reminder to each of a third subset of the plurality of mobile electronic devices that have not responded to the invitations; initiating, a second predetermined amount of time prior to the gift date, a physical gift purchase as part of the group gift using funds deducted from or charged to accounts associated with at least the first subset of the plurality of mobile electronic devices, wherein the second predetermined amount of time is configured to facilitate delivery of the physical gift purchase to the receiver of the gift on or before the gift date; and sending, on the gift date, a message to a gift receiver electronic device comprising information about a monetary gift, wherein the monetary gift is a remainder of the funds deducted from or charged to accounts associated with at least the first subset of the plurality of mobile electronic devices that was not used for the physical gift purchase.

Clause 17. The non-transitory computer readable medium of clause 16, wherein the computing device is further configured to send, to the initiator electronic device and the first subset of the plurality of mobile electronic devices a confirmation message indicating that the physical gift has been delivered and that the message has been sent to the gift receiver electronic device.

Clause 18. The non-transitory computer readable medium of clause 16, wherein the computing device is further configured to receive, from a first mobile electronic device of the plurality of mobile electronic devices, a delegation of responsibility for responding to a first invitation of the invitations received by the first mobile electronic device, wherein the delegation represents an authorization from a first user to a second user to respond to the invitation.

Clause 19. The non-transitory computer readable medium of clause 18, wherein the computing device is further configured to: determine, based on the delegation, a delegated mobile electronic device associated with the second user, wherein the delegated mobile electronic device was not part of the plurality of mobile electronic devices to which the invitations were originally sent; and send, an invitation to contribute to the group gift to the delegated mobile electronic device.

Clause 20. The non-transitory computer readable medium of clause 19, wherein the computing device is further configured to: receive the first response from the delegated mobile electronic device; and for the group gift, deduct funds from or charge to an account associated with the first electronic device of the first user.

Any publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:

receiving, by one or more processors, a request to initiate a group gift from an initiator electronic device, wherein the request indicates a recipient of the gift;

determining, by the one or more processors, a plurality of electronic devices to send a first type of invitations and a second type of invitations to in order to contribute to the group gift comprising:

determining, based on a database having identifying information associated with the plurality of electronic devices, that a first portion of the plurality of electronic devices have previously installed an application (app) associated with the payment processing system; and determining, based on the database, that a second portion of the plurality of electronic devices do not have the app installed thereon;

sending, by the one or more processors, the first type of invitations to the first portion of the plurality of electronic devices, wherein each of the first type of invitations comprises a first message configured to be received and displayed via the app on each of the first portion of the plurality of electronic devices, and further wherein the first message is configured to be interacted with by a first user via a first graphical user interface element to contribute to the group gift or not;

sending the second type of invitations to the second portion of the plurality of electronic devices, wherein each of the second type of invitations comprises a second message configured to be received and displayed by each of the second portion of the plurality of electronic devices without having the app installed thereon, and further wherein the second message is configured to be interacted with by a second user via a second graphical user interface element to contribute to the group gift or not;

receiving, by the one or more processors, a response from each of a first subset of the plurality of electronic devices indicating each contribution to the group gift; and initiating, by the one or more processors, a gift purchase as part of the group gift using funds deducted from or charged to accounts associated with at least the subset of the plurality of electronic devices.

2. The method of claim 1, wherein the request to initiate the group gift further comprises an indication identifying a plurality of potential contributors for the group gift associated with the plurality of electronic devices.

3. The method of claim 1, wherein the first portion of the plurality of electronic devices are mobile electronic devices, the first type of invitations each comprise a push notification, and the response from at least one of the subset of the plurality of electronic devices comprises a response to a prompt presented in the push notification.

4. The method of claim 3, wherein the response to the prompt comprises selecting an option presented in the first graphical user interface element.

5. The method of claim 1, wherein the second portion of the plurality of electronic devices are mobile electronic devices, the second type of invitations each comprise a text message, and the response from at least one of the subset of the plurality of electronic devices comprises a response to a prompt presented in the text message.

6. The method of claim 5, wherein the response to the prompt is a return text message.

7. The method of claim 1, wherein the second type of invitations each comprise an email message and the response from at least one of the subset of the plurality of electronic devices comprises a response to a prompt presented in the email message.

8. The method of claim 7, wherein the response to the prompt is a return email message.

9. The method of claim 1, wherein the database further indicates which of the plurality of electronic devices is a mobile electronic device and which of the plurality of electronic devices is a non-mobile electronic device.

10. The method of claim 1, wherein the gift purchase is a physical gift. further comprising determining the second predetermined amount of time based on an estimated shipping time to deliver the physical gift.

11. The method of claim 10, wherein the request to initiate the group gift specifies a date on which the recipient should receive the group gift.

12. The method of claim 11, wherein the initiating of the gift purchase occurs a predetermined amount of time prior to the date based on an estimated shipping time to deliver the physical gift.

13. A system comprising:

a memory;

at least one processor coupled to the memory, the processor configured to:

receive a request to initiate a group gift from an initiator electronic device, wherein the request comprises indicates a receiver of the gift;

determine a plurality of mobile electronic devices to send a first type of invitations and a second type of invitations to in order to contribute to the group gift comprising:

determine, based on a database having identifying information associated with the plurality of mobile electronic devices, that a first portion of the plurality of mobile electronic devices have previously installed an application (app) associated with a payment processing system and configured to receive a push notification, and determine, based on the database, that a second portion of the plurality of mobile electronic devices do not have the app installed thereon;

send the first type of invitations to the first portion of the plurality of mobile electronic devices, wherein each of the first type of invitations comprises a push notification to the app on each of the first portion of the plurality of mobile electronic devices, and further wherein the push notification comprises a first graphical user interface element programmed to allow a first user to contribute or not;

send the second type of invitations to the second portion of the plurality of mobile electronic devices, wherein each of the second type of invitations comprises a text message to each of the second portion of the plurality of mobile electronic devices, and further wherein the text message comprises a second graphical user interface element programmed to allow a second user to contribute or not;

receive a first response from each of a subset of the plurality of mobile electronic devices indicating each contribution to the group gift; and initiate a gift purchase as part of the group gift using funds deducted from or charged to accounts associated with at least the ubset of the plurality of mobile electronic devices.

14. The system of claim 13, wherein the processor is further configured to:
receive, along with the response from each of the subset of the plurality of mobile electronic devices, a personalized message to a recipient of the group gift; and
incorporating the personalized message from each of the subset of the plurality of mobile electronic devices into message sent to a gift receiver electronic device.

15. The system of claim 13, further comprising sending a message to a gift receiver electronic device comprising a hyperlink which, when selected by a user, causes the gift receiver electronic device to navigate to a webpage or application that receives a selection of an available gift card or a physical gift.

16. The system of claim 15, wherein at least one of the available gift card and the second physical gift are available through a payment processing entity's reward network.

17. A non-transitory computer readable medium having instructions stored thereon that, upon execution by a computing device, cause the computing device to perform operations comprising:
receiving a request to initiate a group gift from an initiator electronic device, wherein the request indicates a receiver of the group gift;
determining a plurality of electronic devices to send a first type of invitations and a second type of invitations to in order to contribute to the group gift comprising:
determining, based on a database having identifying information associated with the plurality of electronic devices, that a first portion of the plurality of electronic devices are mobile electronic devices, and
determining, based on the database, that a second portion of the plurality of electronic devices are non-mobile electronic devices;
sending the first type of invitations to the first portion of the plurality of electronic devices, wherein each of the first type of invitations comprises a first message configured to be received and displayed on the mobile electronic devices, and further wherein the first message is configured to be interacted with by a first user via a first graphical user interface element to contribute to the group gift or not;
sending the second type of invitations to the second portion of the plurality of electronic devices, wherein each of the second type of invitations comprises a second message configured to be received and displayed on the non-mobile electronic devices, and further wherein the second message is configured to be interacted with by a second user via a second graphical user interface element to contribute to the group gift or not;
receiving a first response from each of a subset of the plurality of electronic devices indicating each contribution to the group gift; and
initiating a gift purchase as part of the group gift using funds deducted from or charged to accounts associated with at least the subset of the plurality of electronic devices.

18. The non-transitory computer readable medium of claim 17, wherein the computing device is further configured to send, to the initiator electronic device and the first subset of the plurality of mobile electronic devices a confirmation message indicating that the gift has been delivered to the recipient.

19. The non-transitory computer readable medium of claim 17, wherein the computing device is further configured to receive, from a first electronic device of the plurality of electronic devices, a delegation of responsibility for responding to a first invitation, wherein the delegation represents an authorization from a first user to a second user to respond to the invitation.

20. The non-transitory computer readable medium of claim 19, wherein the computing device is further configured to:
determine, based on the delegation, a delegated electronic device associated with the second user, wherein the delegated electronic device was not part of the plurality of electronic devices to which the invitations were originally sent;
send, a second invitation to contribute to the group gift to the delegated electronic device;
receive a response from the delegated electronic device; and
for the group gift, deduct funds from or charge to an account associated with the first electronic device of the first user.

* * * * *